(12) United States Patent
Mueller

(10) Patent No.: US 8,397,991 B2
(45) Date of Patent: Mar. 19, 2013

(54) PROTECTIVE DEVICE AND METHOD FOR PREVENTING SKIMMING ON A CARD READER

(75) Inventor: Achim Mueller, Bielefeld (DE)

(73) Assignee: Wincor Nixdorf International GmbH (DE)

(*) Notice: Subject to any disclaimer, the term of this patent is extended or adjusted under 35 U.S.C. 154(b) by 178 days.

(21) Appl. No.: 12/919,875

(22) PCT Filed: Mar. 2, 2009

(86) PCT No.: PCT/EP2009/052446
§ 371 (c)(1),
(2), (4) Date: Aug. 27, 2010

(87) PCT Pub. No.: WO2009/109543
PCT Pub. Date: Sep. 11, 2009

(65) Prior Publication Data
US 2011/0006112 A1 Jan. 13, 2011

(30) Foreign Application Priority Data
Mar. 3, 2008 (DE) .......................... 10 2008 012 231

(51) Int. Cl.
*G06K 7/08* (2006.01)
(52) U.S. Cl. ........................................ 235/450; 235/449
(58) Field of Classification Search .................. 235/449, 235/450, 475, 477, 480; 360/2, 101
See application file for complete search history.

(56) References Cited

U.S. PATENT DOCUMENTS

| | | | |
|---|---|---|---|
| 6,390,367 B1 | 5/2002 | Doig | |
| 6,629,643 B1 | 10/2003 | Nagata et al. | |
| 7,100,829 B2* | 9/2006 | Okada | 235/439 |
| 7,281,656 B2* | 10/2007 | Nagata et al. | 235/449 |
| 7,377,434 B2* | 5/2008 | Wakabayashi | 235/449 |
| 7,721,963 B2* | 5/2010 | Schliebe et al. | 235/450 |

(Continued)

FOREIGN PATENT DOCUMENTS

| | | |
|---|---|---|
| DE | 4414159 C1 | 7/1995 |
| DE | 102005043317 B3 | 4/2007 |
| EP | 1067474 A2 | 1/2001 |
| EP | 1394728 A1 | 3/2004 |
| EP | 1798662 A1 | 6/2007 |
| WO | WO 2007048649 A1 * | 5/2007 |

OTHER PUBLICATIONS

"Identification cards—recording technique", International standard ISO/IEC, XX,XX, Bd. 7811-2, Nr. Third Edition, Feb. 1, 2001, pp. 1-21.

*Primary Examiner* — Michael G Lee
*Assistant Examiner* — Suezu Ellis
(74) *Attorney, Agent, or Firm* — Harness, Dickey & Pierce, P.L.C.

(57) ABSTRACT

A protective device (26, 28) is proposed that contains a protective generator (26) and an inductor (28) to generate an electromagnetic protective field (29) that is suitable for compromising the function of the spying device (SM), wherein the protective device (26, 28) generates an electromagnetic protective field (29) with a protective signal that simulates the type of signal that occurs when magnetic stripe cards are read. Through the protective field a special protective signal is induced in the potentially present skimming module to imitate the reading of the magnetic stripe card. The skimming card reader reads a pseudo magnetic stripe card, or is at least confused when spying on the genuine magnetic stripe card. In particular, the protective signal can contain pseudo data that are mixed with the actual card data at demodulation or suppress said data completely (capture effect) so that the third party ultimately obtains unusable data.

19 Claims, 1 Drawing Sheet

U.S. PATENT DOCUMENTS

| | | |
|---|---|---|
| 2002/0036879 A1 | 3/2002 | Vacherand et al. |
| 2006/0124756 A1 | 6/2006 | Brown |
| 2007/0131768 A1 | 6/2007 | Wakabayashi |
| 2011/0135092 A1* | 6/2011 | Lehner .................. 380/252 |

\* cited by examiner

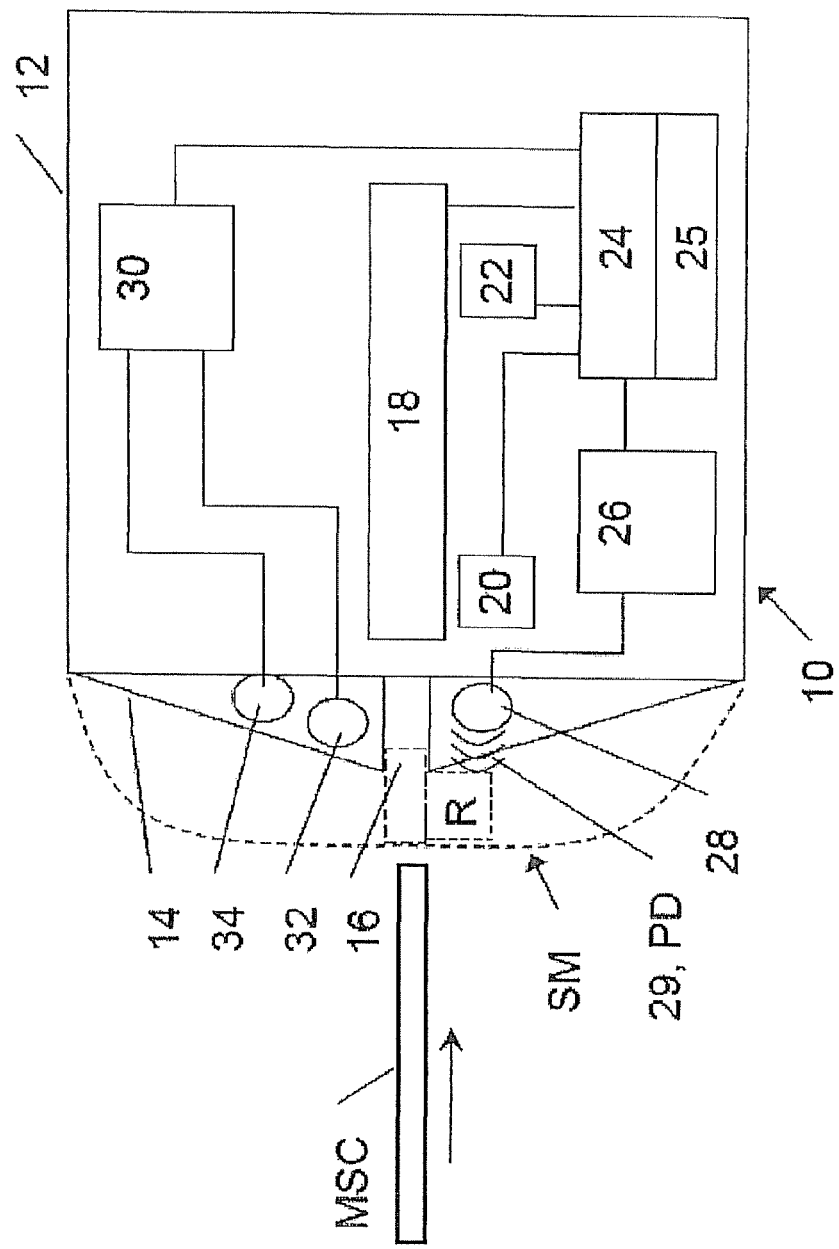

PROTECTIVE DEVICE AND METHOD FOR PREVENTING SKIMMING ON A CARD READER

CROSS-REFERENCE TO RELATED APPLICATIONS

This application is a National Stage of International Application No. PCT/EP2009/052446, filed Mar. 2, 2009. This application claims the benefit and priority of German application 10 2008 012 231.9, filed Mar. 3, 2008. The entire disclosures of the above applications are incorporated herein by reference.

BACKGROUND

This section provides background information related to the present disclosure which is not necessarily prior art.
Technical Field The present invention relates to a protective device for a card reader. The invention further relates to a self-service terminal equipped with the protective device, specifically an ATM, an account statement printer or an information terminal, and a method applied thereto to prevent data being read from a magnetic stripe card by means of a spying device that has been installed with fraudulent intent by third parties in the proximity of the card reader.
Discussion Traditional self-service terminals are frequently encountered operating as ATMs or account statement printers. In order to use them, the user, or customer, needs a bank card that is usually the same as a magnetic stripe card to be read by a card reader, on which card data including the customer's personal and account data are stored. Unfortunately, manipulation is being practiced to an increasing degree at self-service terminals by third parties to gain access to these card data in a fraudulent manner. For this purpose, a special spying device is installed as unobtrusively as possible at the particular self-service terminal that essentially contains a small, foreign card reader that is mounted whenever possible directly in front of the actual slot on the self-service terminal, or the actual card reader. When a customer inserts his bank card into the card reader on the self-service terminal, its magnetic stripe is also read by this foreign card reader, whereby the third party acquires the card data, specifically the customer and account data, and it is then possible to produce an illegal copy of the bank card. If the third party is able in addition to spy out the confidential numeric password (PIN) associated with the bank card, he can easily withdraw money from the particular account using the counterfeit bank card and the pilfered PIN.

In professional circles, the fraudulent method just described for spying on card data or customer information is known as skimming or card abuse. One possibility for preventing it, or at least making it more difficult, is to generate a protective electromagnetic field suitable for compromising the read function of the magnetic card reading head in the spying device. To do this, the protective field must be generated, or take effect, at the exact spot where the spying device is normally installed, that is to say, immediately in front of the insertion slot of the "genuine" or actual card reader. In addition, the protective field must be sufficiently strong to ensure that the read function of the spying device is effectively compromised or blocked and that the data can no longer by read from the magnetic stripe card by skimming.

However, it is not easy to align or position a protective field of this type with such a degree of accuracy and also to adjust its field strength so that the read function of the actual card reader on the self-service terminal is not compromised by mistake at the same time. For example, in many card readers there is a magnetic stripe pre-recognition head immediately behind the insertion slot with the aid of which it can be determined whether the magnetic stripe card has been inserted correctly. This magnetic stripe pre-recognition head is usually located close to the area in which the protective field takes effect. As a result it can easily happen that the magnetic stripe pre-recognition head is compromised by the protective field when reading. Additionally, reading heads arranged in the interior of the card reader are compromised or interfered with by the protective field by mistake when reading. Consequently, it often proves difficult in practice to achieve a good balance between an optimal alignment and adequate field strength for the protective field on the one hand and reliable operation of the card reader without interference on the other.

In order to overcome this problem, a protective device is proposed in DE 10 2005 043 317 B3 that can be used advantageously in a self-service terminal, in particular an ATM, account statement printer and/or information terminal. The protective device has a protective field generator and an associated inductor to generate an electromagnetic protective field in the form of an alternating field that is suitable for interfering with the operation of a spying or skimming device, wherein the protective device is activated by a control unit of the card reader for controlling a card transportation device in the card reader in such manner that the protective field is reduced or deactivated at least for the time period of reading the magnetic stripe in the proper card reader such that reading the magnetic stripe card in the actual card reader is not negatively affected by the protective field. In this way, the protective field generator is deactivated only occasionally and precisely when or while the magnetic stripe card is being read by the proper and "genuine" card reader. As long as there is no card in the card reader, the protective field is activated and takes effect against potential skimming with sufficient field strength. This solution ensures that the actual card reading process is not negatively affected or interfered with by the anti-skimming measures, but it is associated with a certain expense to achieve the temporary deactivation of the protective field.

SUMMARY OF THE INVENTION

An object of the invention is, therefore, to cite an improved protective device of the type described at the beginning to generate an electromagnetic protective field. Specifically, a protective field is to be generated that can remain permanently activated whenever possible. In addition, a self-service terminal equipped with such a protective device and a method to generate such a protective field are proposed.

Accordingly, the protective device proposed here is characterized in that the protective device generates by means of a protective-field generator an electromagnetic field that comprises a protective signal that simulates a signal of the type that occurs when magnetic stripe cards are read.

Through the protective field, a special protective signal is induced in a potentially present spying device (skimming module) in order to imitate reading a magnetic stripe card. Consequently, the skimming card reader reads a pseudo magnetic stripe card, or is at least considerably confused when spying on the genuine magnetic stripe card. The third party, or skimmer, is deceived into thinking he has spied successfully so that initially he notices nothing of the protective measure. The protective signal can at least match a standardized signal format for reading magnetic stripe cards. Specifically, the protective signal can contain pseudo data that are mixed in with the actual card data upon demodulation or suppress them completely (capture effect) so that the third party finally obtains unusable data. However, it is possible he will not notice this until he wants to use a magnetic stripe card prepared with these data.

Thus it is advantageous if the protective field generator creates a protective signal modulated with pseudo data that simulate the type of data stored on magnetic stripe cards. In this connection, it is advantageous if the protective field generator creates the pseudo data in accordance with at least one standardized data format for reading magnetic stripe cards at the card reader and/or creates data content. For example, F2F-coded fictitious card data can be created.

It is also advantageous if the protective field generator generates the protective signal modulated with the pseudo data at a protective signal frequency that is adapted to a data rate or data speed that occurs with a normal insertion and/or removal of the magnetic stripe card into or from a card reader. The pseudo data can also comprise synchronization data, specifically in the form of preceding zeroes and/or starting or ending characters.

The pseudo data preferably represent a continuous data stream.

The protective device, specifically the protective field generator, can generate the modulated protective signal using pseudo data in the form of at least two data streams at least partly superimposed one over the other.

BRIEF DESCRIPTION OF THE DRAWING

The invention is now described in the following description using an embodiment with reference to the Figure 1.

The drawing described herein is for illustrative purposes only of selected embodiments and not all possible implementations, and is not intended to limit the scope of the present disclosure.

DETAILED DESCRIPTION OF THE PREFERRED EMBODIMENTS

Example embodiments will now be described more fully with reference to the accompanying drawings.

The following description clarifies the protective measures against skimming proposed here using the example of a card reader for a self-service terminal, wherein a protective device configured in accordance with the invention prevents the genuine card data from being read from a magnetic stripe card to be inserted by means of a spying device installed in the proximity of the card reader.

The sole FIGURE shows a schematic representation of the structure of a card reader 10 that is used for a self-service terminal, in the embodiment shown for an account statement printer or an ATM. The card reader 10 has a housing 12 with a cover 14 on the front side that preferably comprises a synthetic material cover. An insertion area in the form of a slot 16 is formed in the cover 14 through which the magnetic stripe card, here representing a bank card MSC, can be inserted into the card reader 10.

A transport device 18 sits directly behind the insertion slot 16. The transport device 18 generally comprises drums or rollers to transport the bank card as well as drive motors and several sensors to ascertain the position of the bank card in the transport device 18. These details are not shown in the simplified representation in the FIGURE. The transport device 18 also has a flap (not shown) that is closed by a drive (not shown) after the bank card has been inserted.

Inside the transport device 18, a reading device to read the magnetic stripe on the bank card is arranged along the transport route of the magnetic stripe card, or bank card MSC, of which a first magnetic reading head 20 and a second magnetic reading head 22 are shown. The transport device 18 and the reading heads 20 and 22 are operatively connected to a control unit 24 that in turn is operatively connected by way of an interface 25 to a computer or PC (not shown).

In one embodiment, the protective device in accordance with the invention is integrated into the card reader, thereby with this protective device effectively preventing illegal reading of data from the bank card MSC by means of a spying device SM positioned by a third party directly in front of the insertion slot 16 (indicated in the FIGURE by dashed lines). The protective device comprises a protective field generator 26 operatively connected to the control unit 24, to which a protective field inductor 28 is attached.

This inductor is located in the proximity of the insertion area, or slot, 16 and broadcasts outward the protective field 29 generated by the protective field generator 26 and provided with the modulated protective signal. The electromagnetic protective field 29 contains a protective signal generated as a pseudo-magnetic card signal that specifically contains pseudo data PD that simulate the type of data that are used when reading a magnetic strip cards. Thus, any reading sensor R of the spying device SM mounted in the proximity of the insertion slot 16 receives the protective signal containing these pseudo data PD, whereby in turn the spying device SM, and specifically a demodulation stage provided therein (not shown), are negatively affected. The electromagnetic protective field 29 can be generated with low radiation power that is sufficient to affect the reading sensor R in the spying device SM.

When the protective device is operating, the protective field generator 26 and the inductor 28 operatively connected thereto create an electromagnetic protective field 29 of a type that is particularly suited to compromise the function of the spying device SM since the electromagnetic protective field 29 contains a protective signal generated as a pseudo-magnetic card signal that specifically contains pseudo data PD that simulate the type of data that are used when reading magnetic stripe cards. The inductor 28 for generating and radiating the protective field 29 can be integrated into the cover 14 of the card reader, for example, wherein the cover preferably consists of a synthetic material.

The protective field 29 generated here with the pseudo data represents an alternating electromagnetic field. The protective field 29 can be generated permanently, specifically in the form of a continuous data stream.

The protective field does not absolutely have to be in place permanently, but can be deactivated temporarily. It can be arranged, for example, that the electromagnetic protective field 29 is only in place when there is no magnetic stripe card in the actual card reader 10. In this way, the protective mechanism is activated only when it is necessary, i.e. when a user inserts his card MSC into the card slot 16.

The protective device shown here can also contain a metal detector 30 that is similarly operatively connected to the control unit 24 and to which a first inductor 32 and a second inductor 34 are attached. The protective field inductor 28, the first inductor 32 and the second inductor 34 are preferably configured as coils and preferably cast into the synthetic material cover 14 of the card reader 10 and thus integral therewith. With the aid of the coils 32 and 34, the metal detector 30 can determine whether an external reading device, as for example the skimming module SM shown, has been installed. The control unit 24 operatively connected to the metal detector 30 can then activate the protective field generator 26 depending on the status determined and thus make generation of the protective field 29 status-dependent.

For example, the metal detector 30 generates a primary electromagnetic field in the area of the insertion slot 16 via the first inductor 32. This primary electromagnetic field would coact with metal components that are necessarily contained in a foreign reading device or skimming module and generate eddy currents in said components. As a result of the interaction of the primary electromagnetic field with the metal components of the foreign reading device, a secondary electromagnetic field is created which is detected by way of the second inductor 34 of the metal detector 30. In this way, it can be determined by using the metal detector 30 whether a foreign reading device has been installed, for example if a foreign metal object was detected by the metal detector 30 for a predetermined period. Due to the metal detection and the generation of a protective field, the magnetic card belonging to a customer is doubly protected against a spying attack.

When a bank card MSC is inserted into the insertion slot 16, said card is identified with the aid of a sensor and taken by the transport device 18 into the card reader 12 and to the actual reading head 22 of the reading device of the card reader 12 so that the magnetic stripe of the bank card MSC can be read. However, before the bank card MSC is taken hold of at all by the transport device 18 and moved into the card reader 12, it can be determined by the preliminary reading head 20, also described as the magnetic stripe pre-detection head, whether the magnetic stripe is in the correct position, i.e. whether the magnetic stripe card MSC was inserted into the insertion slot 16 oriented correctly.

Since reading the magnetic stripe and the movement of the bank card through the transport device 18 are closely linked and synchronized to each other, the transport device 18 and the reading heads 20 and 22 are controlled by the same control unit. The fact that the beginning and end of the reading of the magnetic stripe by the reading heads 20 and 22 are explicitly established or taken into account by the control unit 24 as part of controlling transportation and reading can now be exploited to synchronize the temporal control of the protective field 29 with the reading process of the card reader 10. To do this, the protective field generator 26 is activated by the same control unit 24 that also controls the transport device 18 and the reading heads 20 and 22 in the reading device, specifically in such a way that while the bank card is being read in the card reader 10, the protective field 29 is reduced or completely deactivated in its field strength and restored after the reading has been completed. Due to the fact that the protective field 29 is deactivated or reduced as a result of these additional protective measures while the bank card is being read in the card reader 10, negative effects on the reading in the actual card reader 10 from the protective field 29 can be prevented in a simple and reliable way.

In summary, a protective device, a self-service terminal equipped with said device, and a method for protecting the self-service terminal containing a card reader are proposed to prevent data being read from a magnetic stripe card by means of a spying device (skimming module). To this end, an electromagnetic protective field is generated that is suitable for compromising the function of the spying device. The protective field acts as an interference field with respect to the skimming module by way of which protective signals or interference signals are broadcast that essentially match signals that are created in a reading head when recording or scanning magnetic stripe cards. As a result, the evaluation algorithms are interfered with, and evaluation by outside persons is made more difficult. Specifically, special interference signals are induced in the skimming module to interfere with the reading head there when the card is inserted into or removed from the card reader, or when the card is drawn through a reader, so that it is no longer possible to evaluate the card data read or only unusable pseudo data are obtained. The signal form of the protective or interference signals is preferably shaped similarly to typical card data signals. Said signals may contain F2F-coded data for example. The signal frequency of the protective signal preferably matches the data rate or usable data speed that occurs in a normal card reading process due to the card being transported.

The pseudo, or interference, data can be generated in the form of a data stream with initial zeros and starting or ending characters. When a skimming module receives this data stream, it is instructed to start the interpretation, recording or transmission to external listening devices and preferably to synchronize with the interference data stream. Synchronization with the data stream of the actual card data is unsuccessful. At best, the genuine card data become mixed with the pseudo data into a volume of data that cannot be utilized further. If the interference data stream is generated continuously, the skimmer is not given an opportunity to read a starting condition with no interference. At best, the result is a signal or data mixture of genuine card data and interference data. In order to make it even more difficult to demodulate or interpret the data stream recorded, a additional interference data stream can be generated and superimposed.

The protective device 26, 28 in accordance with the invention with the protective field generator 26 and the inductor 28 can, as an alternative, be arranged to be integrated into the card reader 10 independently of said card reader at the self-service terminal. Thus, advantageous provision can be made to locate the protective device with the protective field generator 26 and the inductor 28 on the back side of one wall of the self-service terminal behind the insertion slot 16. Accordingly, it is further possible to locate the metal detector 30 with its inductors 32, 34 in this area.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A protective device for a card reader in a self service terminal to prevent reading data from a magnetic stripe card by a spying device that has been installed with fraudulent intent by third parties in a proximity of the card reader, comprising wherein the protective device contains a protective field generator and an inductor operatively connected thereto to generate an electromagnetic protective field that is suitable for compromising a function of the spying device, and wherein the protective device generates an electromagnetic protective field with a protective signal that simulates a type of signal that occurs when magnetic stripe cards are read, the protective signal being modulated with pseudo data that simulate the type of data stored on magnetic stripe cards.

2. The protective device from claim 1, wherein the protective field generator generates the protective signal in accordance with at least one standardized signal format for reading magnetic stripe cards at the card reader.

3. The protective device from claim 2, wherein the protective field generator generates the pseudo data in accordance with at least one standardized data format or data content for reading magnetic stripe cards at the card reader.

4. The protective device from claim 3, wherein the pseudo data represent F2F-coded fictitious card data.

5. The protective device from claim 1, wherein the protective field generator generates the protective signal at a protective signal frequency that is adapted to a data rate or data speed that occurs with a normal insertion or removal of the magnetic stripe card into or from a card reader.

6. The protective device from claim 1, wherein the pseudo data contain synchronization data, specifically in the form of initial zeroes or starting or ending characters.

7. The protective device from claim 1, wherein the pseudo data represent a continuous data stream.

8. The protective device from claim 1, wherein the protective device specifically the protective field generator generates the modulated protective signal with pseudo data in the form of at least two data streams at least partially overlaid on each other.

9. The protective device from claim 1, wherein the inductor is arranged on the card reader in a proximity of an insertion area for the magnetic stripe card, and wherein the inductor broadcasts the protective field provided with the protective signal that is modulated.

10. The protective device from claim 1, wherein the protective device generates the electromagnetic protective field with a radiation strength that is sufficient to affect a reading sensor of the spying device.

11. The protective device from claim 1, wherein the inductor is integrated into a cover of the card reader.

12. The protective device from claim 1, wherein the card reader comprises at least one reading head for magnetic tracks and the protective device is controlled by a control unit of the card reader for controlling a card transport device in the card reader in such a way that the electromagnetic protective field is modified such that a reading of the magnetic stripe card in the card reader is not compromised at least during a period when the magnetic stripe card is being read in the card reader.

13. The protective device from claim 1, wherein the protective field is reduced or deactivated in its field strength during the reading process.

14. The protective device from claim 1, wherein the protective device further comprises a sensor system that is suitable for determining the presence of the spying device.

15. A self-service terminal with a card reader and a protective device for the card reader to prevent data from being read from a magnetic stripe card by means of a spying device that has been installed by third parties with fraudulent intent in a proximity of the card reader, comprising wherein the protective device has a protective field generator and an inductor operatively connected thereto to generate an electromagnetic protective field that is suitable for compromising a function of the spying device, and wherein the protective device generates an electromagnetic protective field with a protective signal that simulates a type of signal that occurs when magnetic stripe cards are read, the protective signal being modulated with pseudo data that simulate the type of data stored on magnetic cards.

16. Self-service terminal from claim 15, wherein the self-service terminal is configured as an ATM (Automatic Teller Machine), an account statement printer or an information terminal.

17. A method for protecting a self-service terminal provided with a card reader, by preventing data from being read from a magnetic stripe card by means of a spying device that has been installed by third parties in a proximity of the card reader with fraudulent intent, comprising wherein, through a protective field generator provided in the protective device and an inductor operatively connected thereto, an electromagnetic protective field is generated that is suited to compromise a function of the spying device, and wherein an electromagnetic protective field with a protective signal is generated that simulates a type of signal that occurs when reading magnetic stripe cards, the protective signal being modulated with pseudo data that simulate the type of data stored on magnetic stripe cards.

18. A protective device for a card reader in a self service terminal to prevent reading data from a magnetic stripe card by a spying device that has been installed with fraudulent intent by third parties in a proximity of the card reader, comprising wherein the protective device contains a protective field generator and an inductor operatively connected thereto to generate an electromagnetic protective field that is suitable for compromising a function of the spying device, and wherein the protective device generates an electromagnetic protective field with a protective signal that simulates a type of signal that occurs when magnetic stripe cards are read, wherein the protective field generator generates the protective signal in accordance with at least one standardized signal format for reading magnetic stripe cards at the card reader.

19. A protective device for a card reader in a self service terminal to prevent reading data from a magnetic stripe card by a spying device that has been installed with fraudulent intent by third parties in a proximity of the card reader, comprising wherein the protective device contains a protective field generator and an inductor operatively connected thereto to generate an electromagnetic protective field that is suitable for compromising a function of the spying device, and wherein the protective device generates an electromagnetic protective field with a protective signal that simulates a type of signal that occurs when magnetic stripe cards are read, wherein the protective field generator generates the protective signal at a protective signal frequency that is adapted to a data rate or data speed that occurs with a normal insertion or removal of the magnetic stripe card into or from a card reader.

* * * * *